(12) United States Patent
Tsai

(10) Patent No.: US 8,848,237 B2
(45) Date of Patent: Sep. 30, 2014

(54) WIRELESS SCANNING DEVICE AND METHOD FOR SCANNING AND TRANSMITTING SCAN DATA

(71) Applicant: Jewel Tsai, Hsin-Chu (TW)

(72) Inventor: Jewel Tsai, Hsin-Chu (TW)

(73) Assignee: Mustek Systems Inc., Hsin-Chu (TW)

( * ) Notice: Subject to any disclaimer, the term of this patent is extended or adjusted under 35 U.S.C. 154(b) by 0 days.

(21) Appl. No.: 13/861,630

(22) Filed: Apr. 12, 2013

(65) Prior Publication Data

US 2013/0286411 A1    Oct. 31, 2013

(30) Foreign Application Priority Data

Apr. 28, 2012   (CN) ..................... 2012 1 0131917

(51) Int. Cl.
    *G06F 15/00*        (2006.01)
    *G06F 1/00*         (2006.01)
    *H04N 1/00*        (2006.01)
    *H04N 1/04*        (2006.01)
    *H04N 1/46*        (2006.01)
    *G06F 3/14*         (2006.01)
    *H04N 21/431*      (2011.01)
    *H04N 21/4363*     (2011.01)
    *G06F 21/84*       (2013.01)

(52) U.S. Cl.
    CPC ........ *H04N 1/00461* (2013.01); *H04N 21/4312* (2013.01); *H04N 21/43637* (2013.01); *H04N 1/00* (2013.01); *G06F 3/1423* (2013.01); *G06F 21/84* (2013.01)
    USPC ........... 358/1.2; 358/1.18; 358/405; 358/474; 358/505

(58) Field of Classification Search
None
See application file for complete search history.

(56) References Cited

U.S. PATENT DOCUMENTS

| | | | | |
|---|---|---|---|---|
| 6,587,034 | B1 * | 7/2003 | Heiman et al. | 340/7.55 |
| 7,283,274 | B2 * | 10/2007 | Sharma | 358/1.18 |
| 8,155,646 | B2 * | 4/2012 | Uchida | 455/434 |
| 2002/0186420 | A1 * | 12/2002 | Wu | 358/405 |
| 2002/0196477 | A1 * | 12/2002 | Chen | 358/474 |
| 2013/0016408 | A1 * | 1/2013 | Lee | 358/505 |

* cited by examiner

*Primary Examiner* — Satwant Singh
(74) *Attorney, Agent, or Firm* — Fitzpatrick, Cella, Harper & Scinto

(57) ABSTRACT

A wireless scanning device includes a scanning module adapted to scan a subject, a processor coupled to the scanning module, and a wireless communication module coupled to the processor for wireless communication with a user device. The processor is operable to control the scanning module to start scanning the subject according to a scan command from the user device. The scanning module is operable to generate scan data segments during scanning. The processor is further operable, for each scan data segment, to generate and transmit a real-time display data segment for real-time display and a compressed data segment for storage to the user device.

11 Claims, 8 Drawing Sheets

WIRELESS SCANNING DEVICE AND METHOD FOR SCANNING AND TRANSMITTING SCAN DATA

CROSS-REFERENCE TO RELATED APPLICATION

This application claims priority to Chinese Application No. 201210131917.6, filed on Apr. 28, 2012.

BACKGROUND OF THE INVENTION

1. Field of the Invention

The invention relates to a scanning device, and more particularly to a wireless scanning device and a method for scanning a subject and transmitting scan data.

2. Description of the Related Art

A conventional scanning device disclosed in U.S. patent application publication no. 2002/0196477 A1 is adapted for wireless connection to at least one external device (such as a personal digital assistant, PDA). The scanning device includes a shell body, a plurality of buttons disposed on the shell body, a transparent platen for placement of a subject, a scanning module for scanning the subject, a control circuit for controlling operation of the scanning module, and a first transceiver using bluetooth protocol. The external device includes a display panel, a control panel, and a second transceiver using bluetooth protocol.

Signals are wirelessly transmitted between the scanning device and the external device through the first and second transceivers. When the signal is a scan command, the scanning device is configured to scan the subject and to transmit scan data to the external device.

However, different wireless transmission protocols have different limitations on transmission bandwidth and distance, and the scan data volume is usually large, so that a user may have to spend too much time waiting for the external device to complete receipt of the scan data when using bluetooth protocol. Furthermore, real-time display of the received scan data on the display panel of the external device is difficult for the external device which is a portable electronic device with limited operation capability and limited storage capacity, such as a mobile phone, PDA, etc., when the scan data is non-processed data and data transmission is not suitably controlled.

SUMMARY OF THE INVENTION

Therefore, an object of the present invention is to provide a wireless scanning device that can overcome the above drawbacks of the prior art.

According to one aspect of the present invention, a wireless scanning device comprises a scanning module adapted to scan a subject, a processor coupled to the scanning module, and a wireless communication module coupled to the processor for wireless communication with a user device.

The processor is configured to receive screen resolution information and a scan command from the user device through the wireless communication module. The screen resolution information indicates a screen resolution of the user device. The processor is operable to control the scanning module to start scanning the subject according to the scan command. The scanning module is operable to generate a plurality of scan data segments during scanning of the subject.

The processor is further operable, for each of the scan data segments, to generate a real-time display data segment according to the screen resolution information, to compress the scan data segment to obtain a compressed data segment, to append a first tag to the real-time display data segment, to append a second tag to the compressed data segment, and to transmit the real-time display data segment with the first tag and the compressed data segment with the second tag to the user device through the wireless communication module. The first tag indicates that the real-time display data segment is for real-time display by the user device. The second tag indicates that the compressed data segment is for storage by the user device.

Another object of the present invention is to provide a method for scanning a subject and for transmitting scan data that can overcome the above drawbacks of the prior art.

According to another aspect of the present invention, a method for scanning a subject and for transmitting scan data is to be implemented by a wireless scanning device capable of wireless communication with a first user device. The method comprises:

a) configuring the wireless scanning device to receive screen resolution information and a scan command from the first user device, the screen resolution information indicating a screen resolution of the first user device;

b) configuring the wireless scanning device to start scanning the subject according to the scan command;

c) configuring the wireless scanning device to generate a scan data segment resulting from scanning of a segment of the subject;

d) configuring the wireless scanning device to generate a real-time display data segment according to the screen resolution information and the scan data segment generated in step c);

e) configuring the wireless scanning device to compress the scan data segment generated in step c) to obtain a compressed data segment;

f) configuring the wireless scanning device to append a first tag to the real-time display data segment generated in step d), and to transmit the real-time display data with the first tag to the first user device, the first tag indicating that the real-time display data segment is for real-time display by the first user device;

g) configuring the wireless scanning device to append a second tag to the compressed data segment, and to transmit the compressed data segment with the second tag to the first user device, the second tag indicating that the compressed data segment is for storage by the first user device; and h) configuring the wireless scanning device to repeat steps c) to g) until scanning of the subject is completed.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
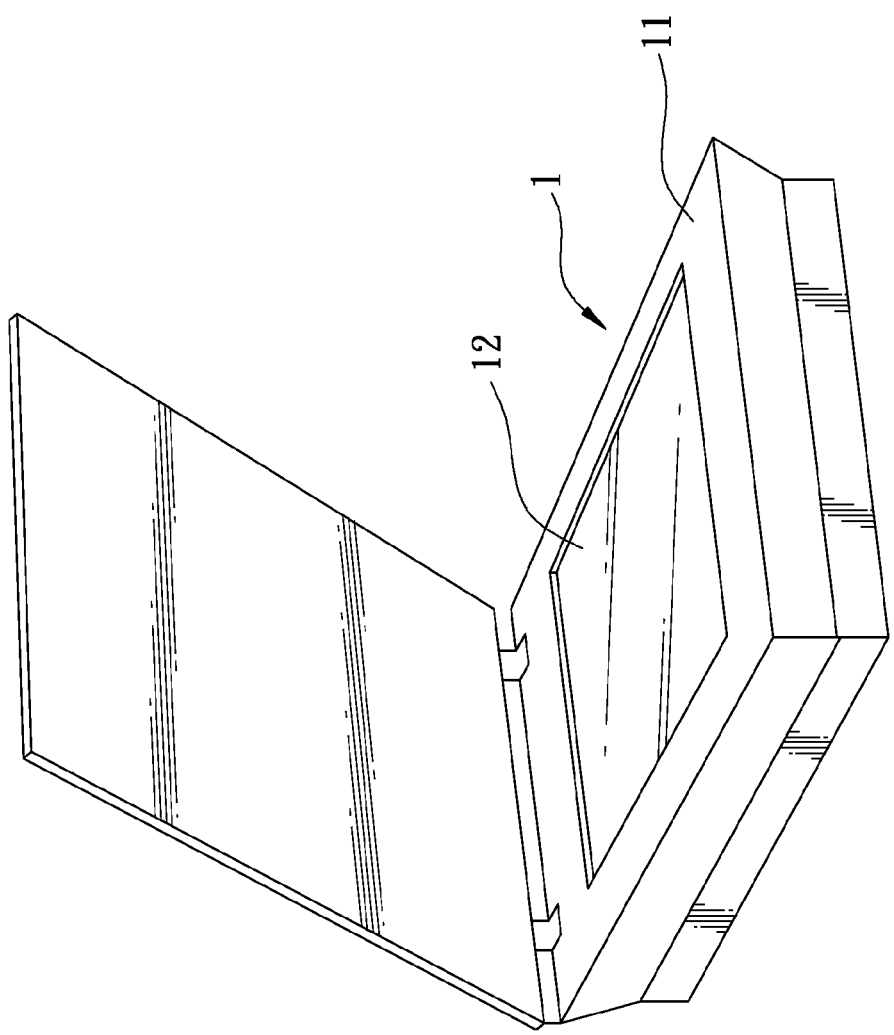
FIG. 1 is a schematic view showing a preferred embodiment of the wireless scanning device according to the present invention.
Figure 2:
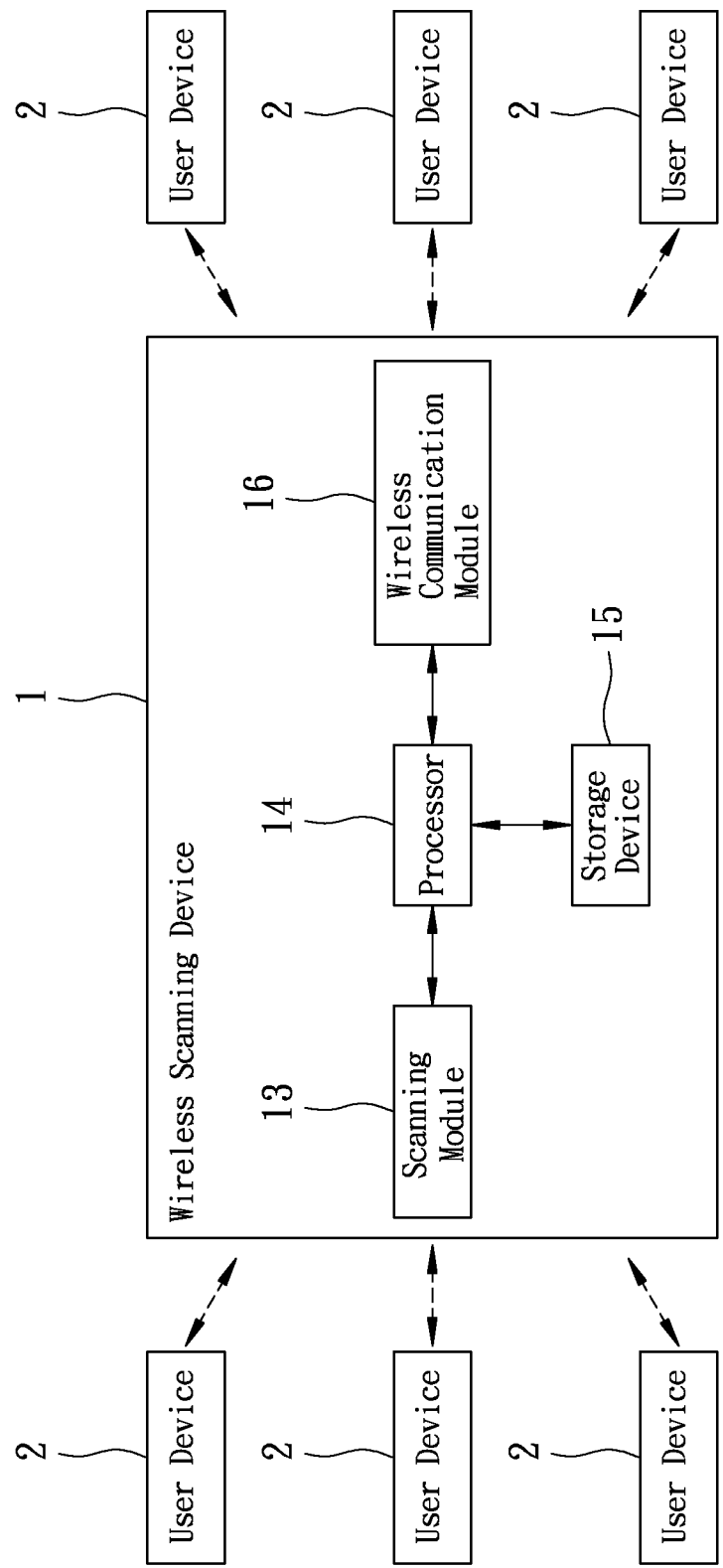
FIG. 2 is a block diagram of the preferred embodiment and user devices.
Figure 3:
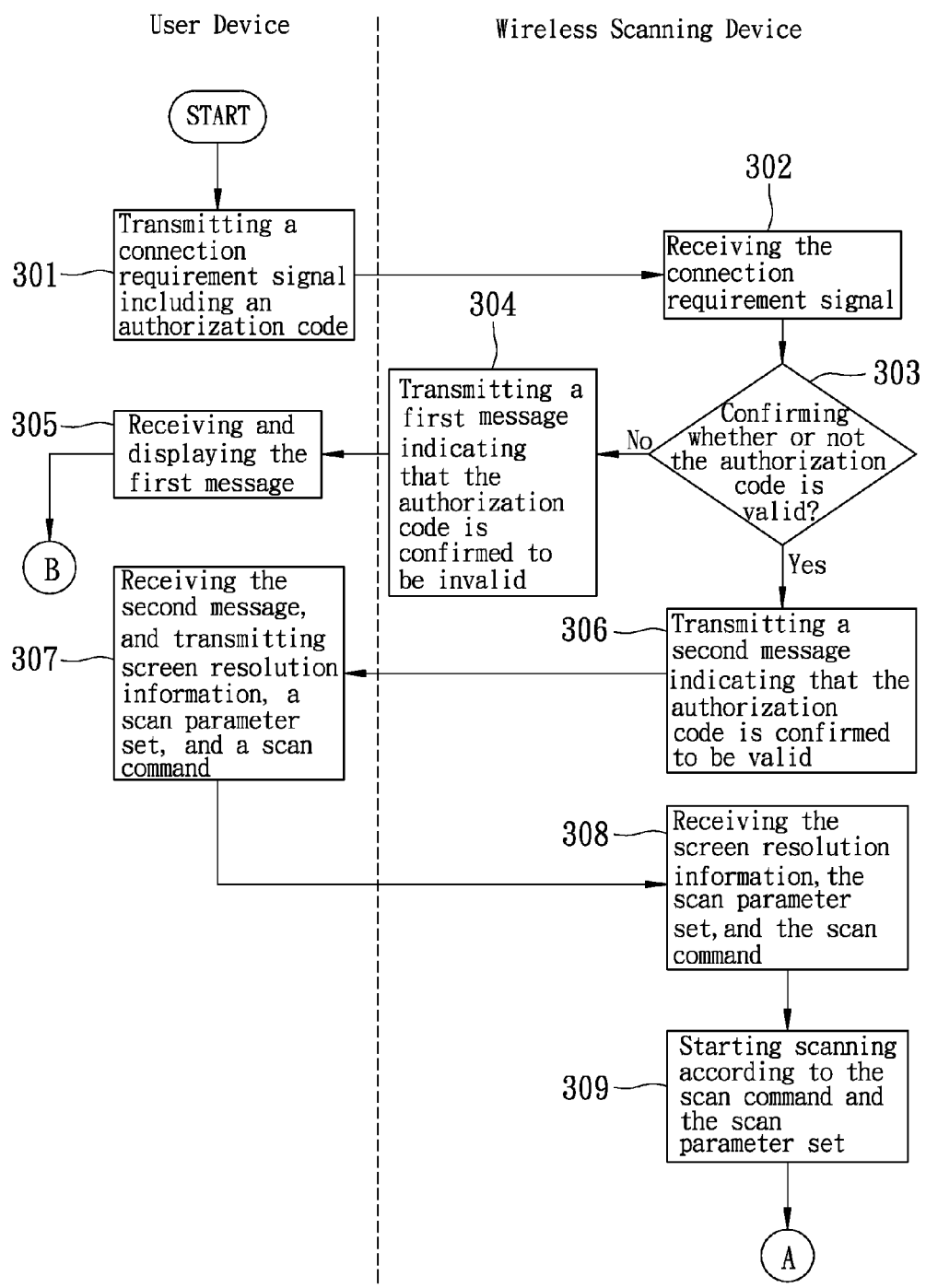
FIGS. 3 and 4 are flow charts illustrating steps of the method for scanning a subject and transmitting scan data in a one-to-one manner according to the present invention.
Figure 4:
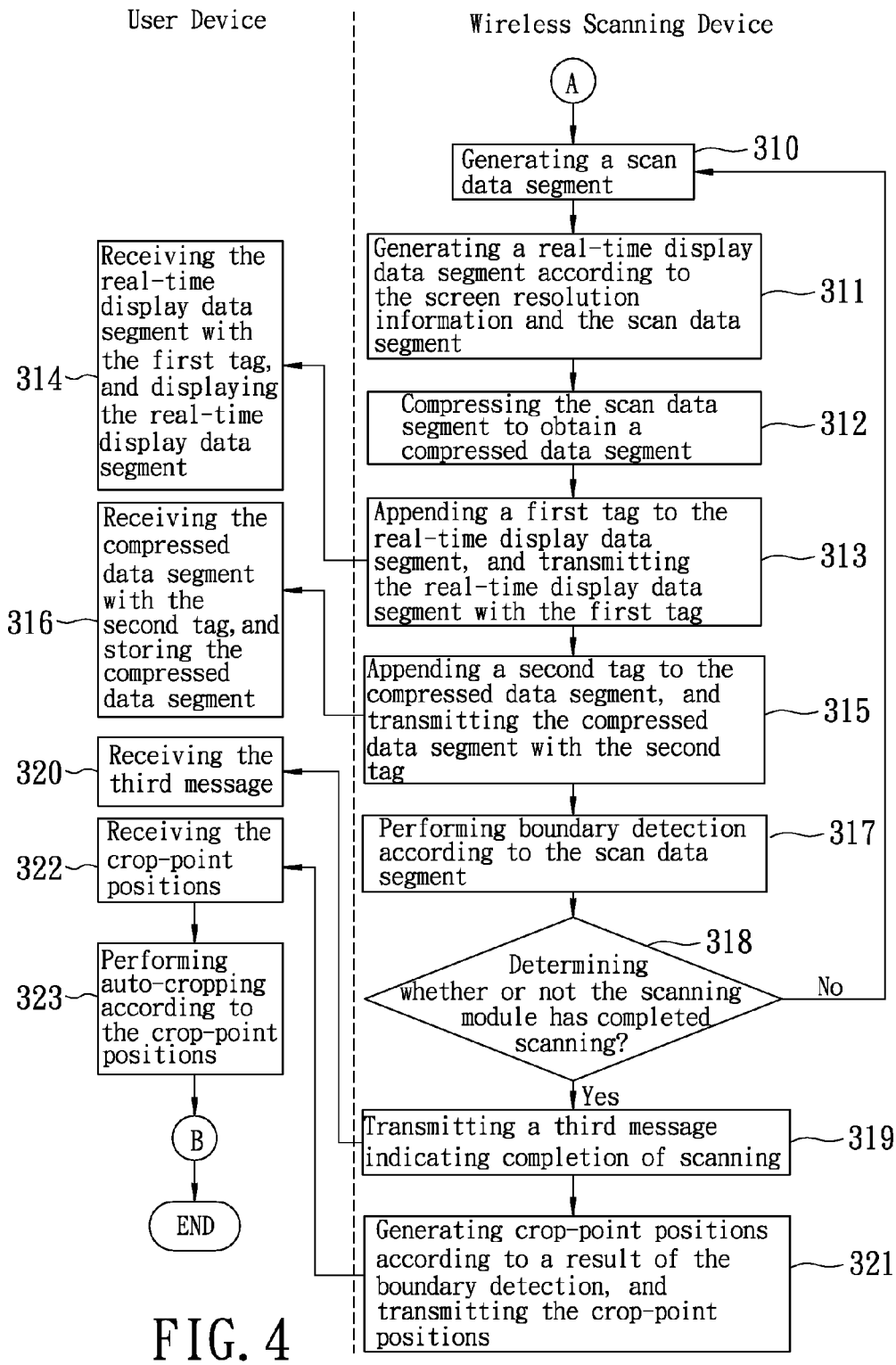

Referring to FIG. 1 and FIG. 2, the preferred embodiment of the wireless scanning device 1 according to this invention is shown to include a shell 11, a scanning platen 12 disposed on the shell 11 for placement of a subject, a scanning module 13 disposed in the shell 11, a processor 14, a storage device 15, and a wireless communication module 16. The scanning module 13, the storage device 15, and the wireless communication module 16 are coupled to the processor 14. In this embodiment, the preferred embodiment is exemplified as a flatbed wireless scanning device 1. In other embodiments, the wireless scanning device 1 may be implemented as a sheet-fed-type or a handheld-type.

The wireless scanning device 1 is operable to communicate with at least one user device 2 through the wireless communication module 16, and each user device 2 is installed with a scan control application. The scanning module 13 is adapted to scan the subject, and is operable to generate a plurality of scan data segments during scanning of the subject. The processor 14 is operable to process each of the scan data segments and to transmit the processed scan data to the user device 2 through the wireless communication module 16 when each of the scan data segments is generated by the scanning module 13.

Implementation of the method for scanning a subject and transmitting scan data according to this invention will be illustrated using a one-to-one manner and a one-to-many manner hereinafter. In the following implementations, the wireless scanning device 1 has been activated for providing scanning service. The scan control application installed in the user device 2 has been executed, and has located the wireless scanning device 1 that is ready to provide the scanning service.

Referring to FIGS. 2 to 5, a first implementation of the method of this invention is illustrated using the one-to-one manner between the wireless scanning device 1 and the user device 2, and includes the steps of:

Step 301: The user device 2 is configured to transmit a connection requirement signal to the wireless scan device 1. The connection requirement signal includes an authorization code.

Step 302: The wireless scanning device 1 is configured to receive the connection requirement signal from the user device 2 through the wireless communication module 16.

Step 303: The processor 14 of the wireless scanning device 1 is configured to confirm whether or not the authorization code is valid. The flow goes to step 304 when the authorization code is confirmed to be invalid, and goes to step 306 when the authorization code is confirmed to be valid.

Step 304: The wireless scanning device 1 is configured to transmit a first message to the user device 2 through the wireless communication module 16. The first message indicates that the authorization code is confirmed to be invalid.

Step 305: The user device 2 is configured to receive the first message, and display the first message to the user.

Step 306: The wireless scanning device 1 is configured to transmit a second message to the user device 2 through the wireless communication module 16. The second message indicates that the authorization code is confirmed to be valid, and wireless connection is successfully established between the wireless scanning device 1 and the user device 2.

Step 307: The user device 2 is configured to receive the second message, and to transmit screen resolution information, a scan parameter set, and a scan command to the wireless scanning device 1. The screen resolution information indicates a resolution of a screen of the user device 2. The scan parameter set includes parameters required for scan operation of the scanning module 13 of the wireless scanning device 1, such as an image scanning resolution, a color scale mode (black-and-white mode, grayscale mode, or color mode), etc. The scan parameter set is known to persons having ordinary skill in the art, and is not detailed herein.

Step 308: The wireless scanning device 1 is configured to receive the screen resolution information, the scan parameter set, and the scan command from the user device 2 through the wireless communication module 16.

Step 309: The processor 14 of the wireless scanning device 1 is configured to control the scanning module 13 to start scanning a subject 121 disposed on the scan platen 12 according to the scan command and the scan parameter set.

Step 310: The scanning module 13 of the wireless scanning device 1 is configured to generate a scan data segment resulting from scanning of a segment of the subject 121, and the processor 14 is configured to temporarily store the scan data segment in the storage device 15.

Figure 5:
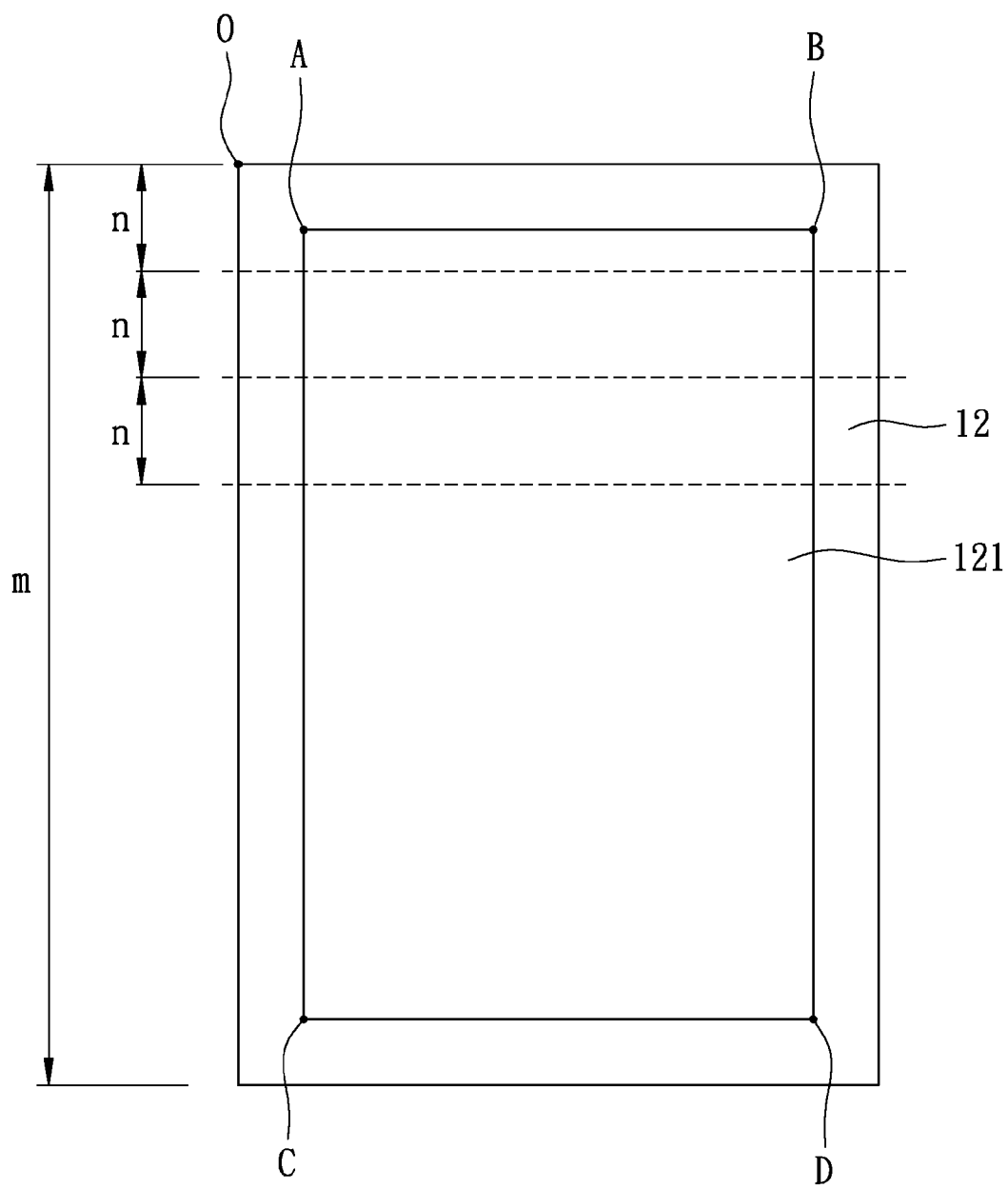
FIG. 5 is a schematic diagram showing a scanning platen of the preferred embodiment.
Figure 6:
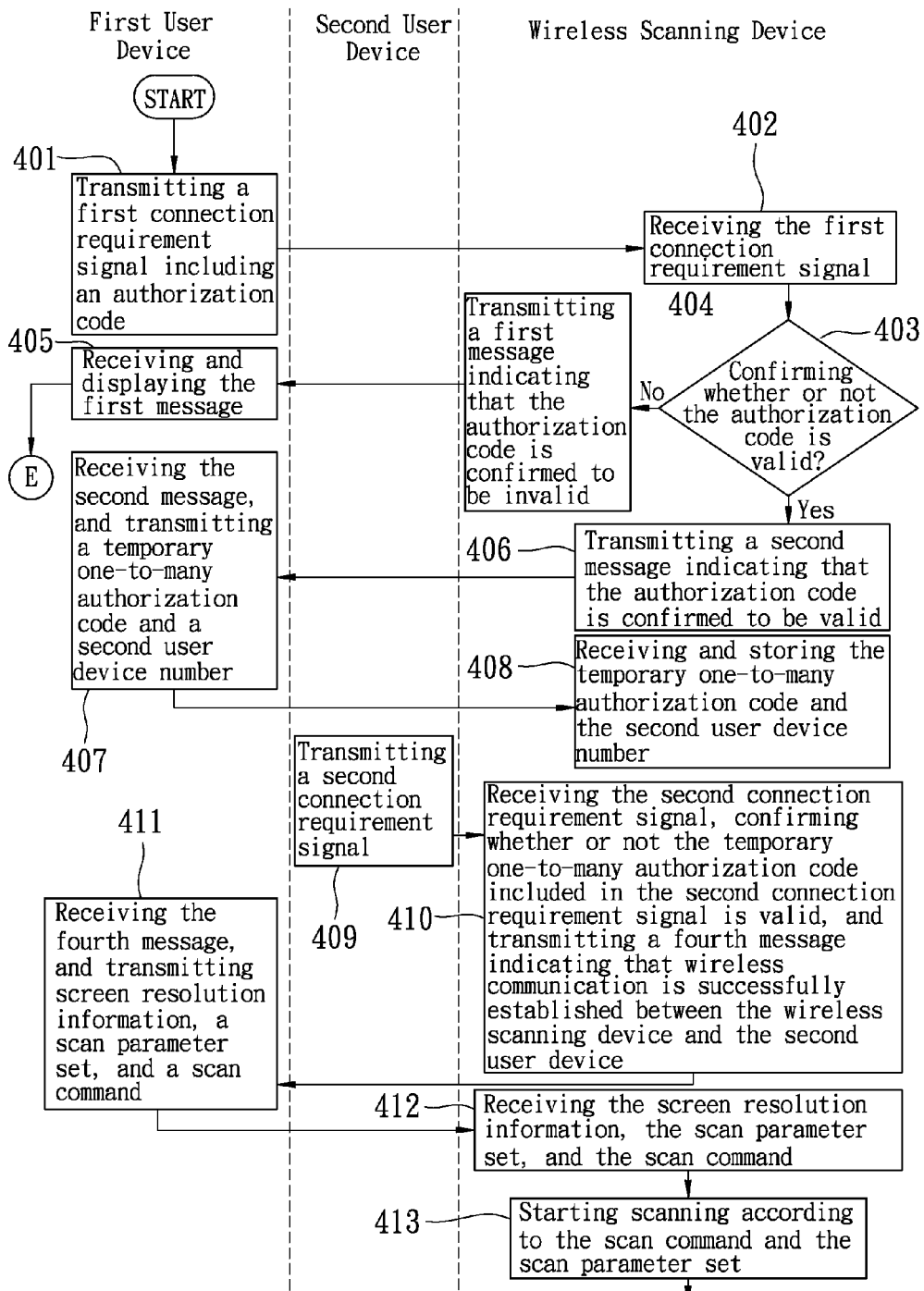
FIGS. 6 to 8 are flow charts illustrating steps of the method for scanning a subject and transmitting scan data in a one-to-many manner according to the present invention.
Figure 7:
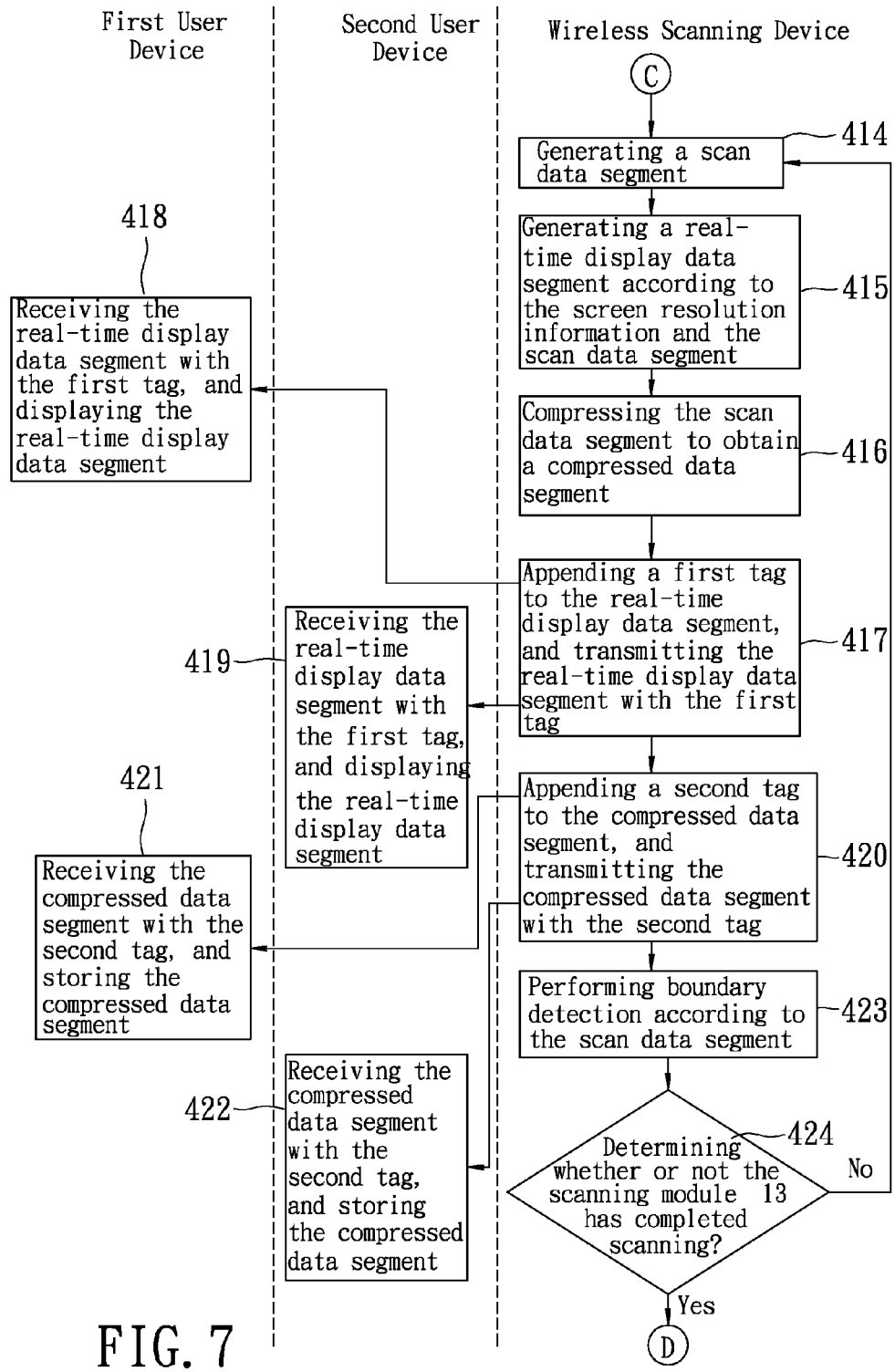
Figure 8:
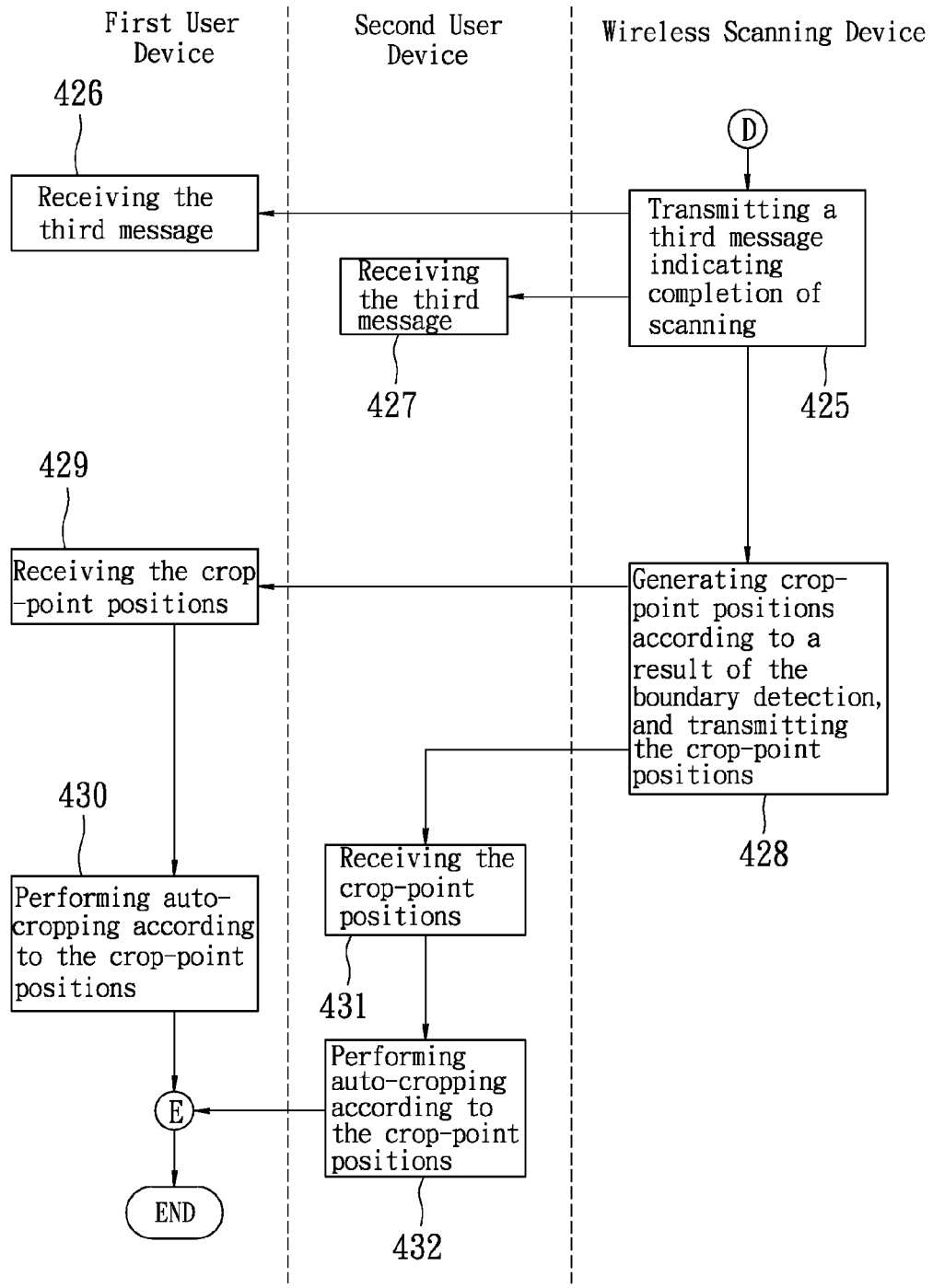

Referring to FIG. 5 as an example, assuming that the scanning module 13 completes one scan operation with m scan lines, the scanning module 13 generates the scan data segment when scanning of n scan lines is completed, where n is smaller than m.

Step 311: The processor 14 of the wireless scanning device 1 is configured to generate a real-time display data segment according to the screen resolution information and the scan data segment that is stored in the storage device 15. In this preferred embodiment, the processor 14 is configured to perform down-sampling on the scan data segment to generate the real-time display data segment when the screen resolution indicated by the screen resolution information is smaller than the image scanning resolution (for example, the user device 2 is a portable electronic device having a smaller screen). That is, data volume of the real-time display data segment is smaller than that of the scan data segment. On the other hand, the processor 14 is configured to use the scan data segment generated by the scanning module 13 as the real-time display data segment when the screen resolution indicated by the screen resolution information is not smaller than the image scanning resolution.

Step 312: The processor 14 of the wireless scanning device 1 is configured to compress the scan data segment stored in the storage device 15 to obtain a compressed data segment. In this preferred embodiment, the processor 14 performs image compression on the scan data segment to obtain the compressed data segment that conforms to a data compression format, such as a joint photographic experts group (JPEG) format.

Step 313: The processor 14 of the wireless scanning device 1 is configured to append a first tag to the real-time display data segment, and to transmit the real-time display data segment with the first tag to the user device 2 through the wireless communication module 16. The first tag indicates that the real-time display data segment is for real-time display by the user device 2.

Step 314: The user device 2 is configured to receive the real-time display data segment with the first tag, and to display the real-time display data segment in real time.

Step 315: The processor 14 of the wireless scanning device 1 is configured to append a second tag to the compressed data segment, and to transmit the compressed data segment with the second tag to the user device 2 through the wireless communication module 16. The second tag indicates that the compressed data segment is for storage by the user device 2.

Step 316: The user device 2 is configured to receive the compressed data segment with the second tag, and to store the compressed data segment.

Step 317: The processor 14 of the wireless scanning device 1 is configured to perform boundary detection of the subject 121 according to the scan data segment. The scan data segment substantially is an image having a plurality of pixel values, and the boundary detection performed in this step is an image processing technique known to those skilled in the art.

Step 318: The processor 14 of the wireless scanning device 1 is configured to determine whether or not the scanning module 13 has completed scanning of the subject 121. The flow goes to step 319 when scanning is determined to be completed, and goes back to step 310 when otherwise.

Step 319: The wireless scanning device 1 is configured to transmit a third message to the user device 2 through the wireless communication module 16. The third message indicates completion of the scan operation.

Step 320: The user device 2 is configured to receive the third message. At this time, the scanning module 13 of the wireless scanning device 1 has completed scanning of the subject 121, so that the user device 2 is operable to completely display a scanned image obtained by down-sampling according to all of the real-time display data segments received thereby. The scanned image obtained by down-sampling conforms to the screen resolution of the user device 2.

Step 321: The processor 14 of the wireless scanning device 1 is configured to generate a plurality of crop-point positions according to a result of the boundary detection, and to transmit the crop-point positions to the user device 2 through the wireless communication module 16. As shown in FIG. 5, the crop-point positions are four crop-point coordinates A to D relative to the origin coordinate point 0. The origin coordinate point 0 corresponds to a left-top corner of the scanning platen 12, and the crop-point coordinates A to D respectively correspond to a left-top corner, a right-top corner, a left-bottom corner, and a right-bottom corner of the subject 121. The processor 14 is configured to transmit the crop-point coordinates A to D that are relative to the origin coordinate point 0 to the user device 2 through the wireless communication module 16.

Step 322: The user device 2 is configured to receive the crop-point positions.

Step 323: The user device 2 is configured to perform auto-cropping according to the crop-point positions.

Furthermore, during step 323, since the scanning module 13 of the wireless scanning device 1 has completed scanning, the user device 2 may perform recovery (for example, through image decompression) using all of the compressed data segments to obtain a recovered scanned image. The user device 2 is then configured to perform auto-cropping on the recovered scanned image according to the crop-point positions, and to compress and store the recovered scanned image that has been auto-cropped. Referring to FIG. 5, the user device 2 is configured to perform auto-cropping according to the crop-point coordinates A to D, and the recovered scanned image after auto-cropping is a subject scanned image corresponding to the subject 121.

It should be noted that step 317 and steps 321 to 323 are optional steps. That is, auto-cropping may be an option to be set by the user of the user device 2, and the scan parameter set further includes an auto-cropping setting value associated with the option. When the auto-cropping setting value corresponds to an intent to perform auto-cropping, step 317 and steps 321 to 323 are executed. Otherwise, step 317 and steps 321 to 323 are skipped.

Referring to FIG. 2 and FIGS. 5 to 8, a second implementation of the method of this invention is illustrated using the one-to-many manner between the wireless scanning device 1, and a plurality of the user devices 2. One of the user devices 2 serves as a console and is called a first user device, and the other user devices 2 are called the second user devices in the following description. The second implementation of the method of this invention includes the steps of:

Step 401: The first user device is configured to transmit a first connection requirement signal to the wireless scan device 1. The connection requirement signal includes an authorization code.

Step 402: The wireless scanning device 1 is configured to receive the first connection requirement signal from the first user device through the wireless communication module 16.

Step 403: The processor 14 of the wireless scanning device 1 is configured to confirm whether or not the authorization code is valid. The flow goes to step 404 when the authorization code is confirmed to be invalid, and goes to step 406 when the authorization code is confirmed to be valid.

Step 404: The wireless scanning device 1 is configured to transmit a first message to the first user device through the wireless communication module 16. The first message indicates that the authorization code is confirmed to be invalid.

Step 405: The first user device is configured to receive the first message, and display the first message to the user.

Step 406: The wireless scanning device 1 is configured to transmit a second message to the first user device through the wireless communication module 16. The second message indicates that the authorization code is confirmed to be valid, and wireless connection is successfully established between the wireless scanning device 1 and the first user device 2.

Step 407: The first user device is configured to receive the second message, and to transmit a temporary one-to-many authorization code and a second user device number to the wireless scanning device 1. The temporary one-to-many authorization code is generated and is used only for the one-to-many scan data transmission at this time. The second user device number indicates the number of the second user devices intended to establish wireless connection with the wireless scanning device 1 at this time.

Step 408: The wireless scanning device 1 is configured to receive the temporary one-to-many authorization code and the second user device number through the wireless communication module 16, and store the temporary one-to-many authorization code and the second user device number.

Step 409: Each of the second user devices is configured to transmit a second connection requirement signal to the wireless scanning device 1. The second connection requirement signal includes the temporary one-to-many authorization code.

As an example of application, there are a teacher and 15 students in a classroom. The teacher has the first user device, and each of the 15 students has one of the second user devices. The teacher may inform the students of the temporary one-to-many authorization code, and instruct the students to start establishing wireless connection between their second user devices and the wireless scanning device 1. Then, the students may use their second user devices to transmit the second connection requirement signal including the temporary one-to-many authorization code.

Step 410: The wireless scanning device 1 is configured to receive the second connection requirement signals through the wireless communication module 16, and the processor 14 is configured to confirm whether or not the temporary one-to-many authorization code included in the respective one of the second connection requirement signals is valid according to the temporary one-to-many authorization code stored in step 408. The wireless scanning device 1 is configured to transmit a fourth message to the first user device through the wireless communication module 16 when wireless connection between the wireless scanning device 1 and each of the second user devices is successfully established (that is, number of the second user devices that have established wireless connection with the wireless scanning device 1 reaches the second user device number). The fourth message indicates that the wireless scanning device 1 has successfully established wireless communication with the first user device and each of the second user devices, respectively.

Step 411: The first user device is configured to receive the fourth message, and to transmit screen resolution information, a scan parameter set, and a scan command to the wireless scanning device 1. The screen resolution information indicates a resolution of a screen of the first user device.

Step 412: The wireless scanning device 1 is configured to receive the screen resolution information, the scan parameter set, and the scan command from the first user device through the wireless communication module 16.

Step 413: The processor 14 of the wireless scanning device 1 is configured to control the scanning module 13 to start scanning a subject 121 disposed on the scan platen 12 according to the scan command and the scan parameter set.

Step 414: The scanning module 13 of the wireless scanning device 1 is configured to generate a scan data segment resulting from scanning of a segment of the subject 121, and the processor 14 is configured to temporarily store the scan data segment in the storage device 15.

Step 415: The processor 14 of the wireless scanning device 1 is configured to generate a real-time display data segment according to the screen resolution information and the scan data segment that is stored in the storage device 15.

Step 416: The processor 14 of the wireless scanning device 1 is configured to compress the scan data segment stored in the storage device 15 to obtain a compressed data segment.

Step 417: The processor 14 of the wireless scanning device 1 is configured to append a first tag to the real-time display data segment, and to transmit the real-time display data segment with the first tag to the first user device and each of the second user devices through the wireless communication module 16. The first tag indicates that the real-time display data segment is for real-time display by the first user device and the second user devices.

Step 418: The first user device is configured to receive the real-time display data segment with the first tag, and to display the real-time display data segment in real time.

Step 419: Each of the second user devices is configured to receive the real-time display data segment with the first tag, and to display the real-time display data segment in real time.

Step 420: The processor 14 of the wireless scanning device 1 is configured to append a second tag to the compressed data segment, and to transmit the compressed data segment with the second tag to the first user device and the second user devices through the wireless communication module 16. The second tag indicates that the compressed data segment is for storage by the first user device and the second user devices.

Step 421: The first user device is configured to receive the compressed data segment with the second tag, and to store the compressed data segment.

Step 422: Each of the second user devices is configured to receive the compressed data segment with the second tag and to store the compressed data segment.

Step 423: The processor 14 of the wireless scanning device 1 is configured to perform boundary detection of the subject 121 according to the scan data segment.

Step 424: The processor 14 of the wireless scanning device 1 is configured to determine whether or not the scanning module 13 has completed scanning of the subject 121. The flow goes to step 425 when scanning is determined to be completed, and goes back to step 414 when otherwise.

Step 425: The wireless scanning device 1 is configured to transmit a third message to the first user device and the second user devices through the wireless communication module 16. The third message indicates completion of the scan operation.

Step 426: The first user device is configured to receive the third message. At this time, the first user device is operable to completely display a scanned image obtained by down-sampling according to all of the real-time display data segments received thereby.

Step 427: Each of the second user devices is configured to receive the third message. At this time, each of the second user devices is operable to completely display a scanned image obtained by down-sampling according to all of the real-time display data segments received thereby.

Step 428: The processor 14 of the wireless scanning device 1 is configured to generate a plurality of crop-point positions according to a result of the boundary detection, and to transmit the crop-point positions to the first user device and the second user devices through the wireless communication module 16.

Step 429: The first user device is configured to receive the crop-point positions.

Step 430: The first user device is configured to perform auto-cropping according to the crop-point positions.

Step 431: Each of the second user devices is configured to receive the crop-point positions.

Step 432: Each of the second user devices is configured to perform auto-cropping according to the crop-point positions.

Operations between the one-to-one manner and the one-to-many manner are similar, and the major difference resides in that, in the one-to-many manner, the wireless scanning device 1 allows the second user devices to establish wireless connection therewith when the second connection requirement signals are received, and the temporary one-to-many authorization codes included in the second connection requirement signals are confirmed to be valid, so that the wireless scanning device 1 is not required to respond to each of the second user devices for notifying grant of the connection request.

In the present invention, the wireless scanning device 1 segments the scan data resulting from scanning of the subject into a plurality of scan data segments for processing, and each of the scan data segments is transmitted after being processed, so that the user may progressively view partial scanned images during scanning through the user device 2, and be made aware of scanning progress, thereby reducing user's impatience from waiting and resulting in higher degree of user friendliness. Moreover, each of the scan data segments for storage is transmitted after being compressed by the wireless scanning device 1, and after being processed by down-sampling operation when the screen resolution is smaller than the image scanning resolution, so as to be suitable for transmission using wireless communication with limited bandwidth. In the example of the one-to-many manner, the wireless scanning device 1 allows the second user devices to establish wireless connection therewith when the second connection requirement signals are received, and the temporary one-to-many authorization codes included in the second connection requirement signals are confirmed to be valid. In other words, the wireless scanning device 1 is not required to respond to each of the second user devices for notifying grant of the connection request, resulting in higher efficiency of communication between the wireless scanning device 1 and each of the second user devices.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A wireless scanning device comprising a scanning module adapted to scan a subject, a processor coupled to said scanning module, and a wireless communication module coupled to said processor for wireless communication with a user device;
  wherein said processor is configured to receive screen resolution information and a scan command from the user device through said wireless communication module, the screen resolution information indicating a screen resolution of the user device, said processor being operable to control said scanning module to start scanning the subject according to the scan command, said scanning module being operable to generate a plurality of scan data segments during scanning of the subject;
  wherein said processor is further operable, for each of the scan data segments, to generate a real-time display data segment according to the screen resolution information, to compress the scan data segment to obtain a compressed data segment, to append a first tag to the real-time display data segment, to append a second tag to the compressed data segment, and to transmit the real-time display data segment with the first tag and the compressed data segment with the second tag to the user device through said wireless communication module, the first tag indicating that the real-time display data segment is for real-time display by the user device, the second tag indicating that the compressed data segment is for storage by the user device.

2. The wireless scanning device as claimed in claim 1, wherein said processor is further configured to receive a scan parameter set having an image scanning resolution from the user device through said wireless communication module, and is operable to control said scanning module to start scanning the subject according to the scan command and the scan parameter set.

3. The wireless scanning device as claimed in claim 2, wherein said processor is further operable, for each of the scan data segments, to perform down-sampling on the scan data segment to generate the real-time display data segment when the screen resolution indicated by the screen resolution information is smaller than the image scanning resolution, and to use the scan data segment as the real-time display data segment when the screen resolution indicated by the screen resolution information is not smaller than the image scanning resolution.

4. The wireless scanning device as claimed in claim 1, wherein said processor is further operable
  for each of the scan data segments, to perform boundary detection of the subject according to the scan data segment,
  to generate a plurality of crop-point positions according to a result of the boundary detection after said scanning module completes scanning of the subject, and
  to transmit the crop-point positions to the user device through said wireless communication module.

5. A method for scanning a subject and for transmitting scan data, said method to be implemented by a wireless scanning device capable of wireless communication with a first user device, said method comprising:
  a) configuring the wireless scanning device to receive screen resolution information and a scan command from the first user device, the screen resolution information indicating a screen resolution of the first user device;
  b) configuring the wireless scanning device to start scanning the subject according to the scan command;
  c) configuring the wireless scanning device to generate a scan data segment resulting from scanning of a segment of the subject;
  d) configuring the wireless scanning device to generate a real-time display data segment according to the screen resolution information and the scan data segment generated in step c);
  e) configuring the wireless scanning device to compress the scan data segment generated in step c) to obtain a compressed data segment;
  f) configuring the wireless scanning device to append a first tag to the real-time display data segment generated in step d), and to transmit the real-time display data segment with the first tag to the first user device, the first tag indicating that the real-time display data segment is for real-time display by the first user device;
  g) configuring the wireless scanning device to append a second tag to the compressed data segment, and to transmit the compressed data segment with the second tag to the first user device, the second tag indicating that the compressed data segment is for storage by the first user device; and
  h) configuring the wireless scanning device to repeat steps c) to g) until scanning of the subject is completed.

6. The method as claimed in claim 5, wherein, in step a), the wireless scanning device is configured to further receive a scan parameter set having an image scanning resolution, and in step b), the wireless scanning device is configured to start scanning the subject according to the scan command and the scan parameter set.

7. The method as claimed in claim 6, wherein step d) includes:
  configuring the wireless scanning device to perform down-sampling on the scan data segment generated in step c) to generate the real-time display data segment when the screen resolution indicated by the screen resolution information is smaller than the image scanning resolution; and
  configuring the wireless scanning device to use the scan data segment generated in step c) as the real-time display data segment when the screen resolution indicated by the screen resolution information is not smaller than the image scanning resolution.

8. The method as claimed in claim 5, further comprising:
  between steps c) and h), configuring the wireless scanning device to perform boundary detection of the subject according to the scan data segment; and
  after step h), configuring the wireless scanning device to generate a plurality of crop-point positions according to a result of the boundary detection, and to transmit the crop-point positions to the first user device.

9. The method as claimed in claim 5, comprising the following steps, before step a):

configuring the wireless scanning device to receive a connection requirement signal having an authorization code from the first user device; and configuring the wireless scanning device to confirm whether or not the authorization code is valid;

wherein step a) is executed only after the authorization code is confirmed to be valid.

10. The method as claimed in claim 6, the wireless scanning device being further capable of wireless communication with a second user device, wherein:

step f) further includes configuring the wireless scanning device to transmit the real-time display data segment with the first tag to the second user device, the first tag further indicating that the real-time display data segment is for real-time display by the second user device; and step g) further includes configuring the wireless scanning device to transmit the compressed data segment with the second tag to the second user device, the second tag further indicating that the compressed data segment is for storage by the second user device.

11. The method as claimed in claim 10, wherein step d) includes:

configuring the wireless scanning device to perform down-sampling on the scan data segment generated in step c) to generate the real-time display data segment when the screen resolution indicated by the screen resolution information is smaller than the image scanning resolution; and configuring the wireless scanning device to use the scan data segment generated in step c) as the real-time display data segment when the screen resolution indicated by the screen resolution information is not smaller than the image scanning resolution.

* * * * *